US008515396B2

(12) United States Patent
Qi et al.

(10) Patent No.: US 8,515,396 B2
(45) Date of Patent: Aug. 20, 2013

(54) METHOD AND SYSTEM FOR PROVIDING PRESENCE INFORMATION USING RINGBACK TONE

(75) Inventors: Quan Qi, Shenzhen (CN); Jian Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 725 days.

(21) Appl. No.: 11/950,229

(22) Filed: Dec. 4, 2007

(65) Prior Publication Data

US 2008/0095326 A1  Apr. 24, 2008

Related U.S. Application Data

(63) Continuation of application No. PCT/CN2007/000352, filed on Feb. 1, 2007.

(30) Foreign Application Priority Data

Apr. 6, 2006 (CN) .......................... 2006 1 0034924

(51) Int. Cl.
H04M 3/42 (2006.01)
(52) U.S. Cl.
USPC .................. 455/414.1; 379/88.19; 379/88.24; 379/201.01; 379/257; 455/414.4
(58) Field of Classification Search
USPC ................................................ 455/411–415
See application file for complete search history.

(56) References Cited

U.S. PATENT DOCUMENTS

| 7,493,125 | B2 * | 2/2009 | Nagesh et al. ............. 455/456.1 |
| 7,620,160 | B2 * | 11/2009 | Tidwell et al. ............. 379/88.25 |
| 8,175,252 | B2 * | 5/2012 | Batni et al. ................. 379/257 |
| 2006/0013377 | A1 | 1/2006 | Ahn et al. |

(Continued)

FOREIGN PATENT DOCUMENTS

| CN | 1514562 A | 7/2004 |
| CN | 1658632 A | 8/2005 |

(Continued)

OTHER PUBLICATIONS

International Search Report from the Chinese Patent Office for International Application No. PCT/CN2007/000352.

(Continued)

*Primary Examiner* — Charles Appiah
*Assistant Examiner* — Jaime Holliday
(74) *Attorney, Agent, or Firm* — Conley Rose, P.C.; Grant Rodolph; Nicholas K. Beaulieu

(57) ABSTRACT

A method for providing ringback tone presence information includes: obtaining a subscription record of a ringback tone presence service corresponding to a user terminal of a call and a routing address of a ringback tone device; connecting the call to the ringback tone device according to the routing address; obtaining the presence information of the called user according to a user terminal number of the call; and sending the presence information of the called user to the calling user terminal. The present invention further provides a system and a ringback tone device for providing presence information. According to the present invention, the calling user may obtain the presence information of the called user via a ringback tone to acquire the state and mood of the called user; therefore, the communication experience is improved; the telecom service types are enriched; and the presence service is popularized.

20 Claims, 4 Drawing Sheets

(56) References Cited

U.S. PATENT DOCUMENTS

| | | | |
|---|---|---|---|
| 2006/0210033 A1* | 9/2006 | Grech et al. | 379/88.19 |
| 2008/0002824 A1 | 1/2008 | No et al. | |
| 2008/0095326 A1 | 4/2008 | Qi et al. | |
| 2010/0151824 A1* | 6/2010 | Shang et al. | 455/411 |

FOREIGN PATENT DOCUMENTS

| | | |
|---|---|---|
| CN | 1878201 A | 12/2006 |
| KR | 10-2002-0063733 | 10/2002 |
| KR | 10-2004-0011571 | 2/2004 |
| WO | WO-2005/081509 A1 | 9/2005 |
| WO | WO 2007/005660 A2 | 1/2007 |

OTHER PUBLICATIONS

Second Chinese Office Action dated (mailed) Nov. 3, 2011, issued in related Chinese Application No. 2006100349249 Huawei Technologies Co., LTD.

Communication (Notification of Reasons for Refusal) from Korean Intellectual Property Office for Korean Applicant No. 10-2008-7023459 mailed May 26, 2010, (7 pages).

Supplemental European Search Report for Application No. EP 07702244.0 dated May 7, 2010 (8 pages).

Communication (Final Office Action) from Korean Intellectual Property Office for Korean Applicant No. 20087023459 (2 pages), mailed Nov. 16, 2010.

Written Opinion of the International Search Authority in PCT Application No. PCT/CN2007/000352 mailed May 17, 2007 (4 pages).

Official Communication from European Patent Office issued on Apr. 7, 2011 in European Application No. 07 702 244.0 (5 pages).

Second Chinese Office Action dated (mailed) Apr. 2, 2011, issued in related Chinese Application No. 200780000324.3 Huawei Technologies Co., LTD.

Foreign Communication From a Counterpart Application, Indian Application No. 3557/KOLNP/2008, Indian Office Action dated Feb. 20, 2013, 2 pages.

Foreign Communication From a Counterpart Application, Chinese Application 200780000324.3, Notice of Allowance dated Nov. 21, 2012, 17 pages.

* cited by examiner

METHOD AND SYSTEM FOR PROVIDING PRESENCE INFORMATION USING RINGBACK TONE

The present application is a continuation of PCT application PCT/CN2007/000352, filed on Feb. 1, 2007, entitled "A METHOD, A SYSTEM AND A RING BACK TONE APPARATUS FOR OFFERING THE PRESENCE INFORMATION USING RING BACK TONE", which claims the benefit of CN Application No. 200610034924.9 filed on Apr. 6, 2006, titled "METHOD, SYSTEM AND RINGBACK TONE DEVICE FOR PROVIDING PRESENCE INFORMATION USING A RINGBACK TONE". The contents of the two applications are incorporated herein by reference in their entirety.

FIELD OF THE INVENTION

The present invention relates to the technology of providing an individualized ringback tone in a communication network, in particular, to a method, a system and a ringback tone device for providing presence information using a ringback tone in a communication network.

BACKGROUND OF THE INVENTION

RingBack Tone Service is a kind of service that allows a user to customize a ringback tone. When a calling user terminal dials a called user terminal, a piece of dulcet music or compliment, or a prompt speech recorded and synthesized by the called user, instead of a normal ringback tone, will be played to the calling user terminal after the called user terminal alerts and before the called user answers. Due to the characteristic of individualization, the ringback tone service has become a fad and is warmly welcomed. However, although there are various solutions to realize the ringback tone service, such as an exchange solution, an intelligent network solution, a called user customization solution and a calling user customization solution, etc, the usual ringback tones are all pre-customized; and at most, different ringback tones are played according to different user numbers, sessions and sites, etc, but different ringback tones cannot be sent according to the current state of the calling user, and the requirements of the user cannot be met more flexibly.

Presence Service is a kind of service in which presence information of a user (presentity), such as state, mood and communication capability, may be obtained in real time and presented to other users (watcher), so that it is convenient for the watcher to select a suitable communication mode or time to communicate with the presentity. But at present, there are some problems in the application of the presence service in the field of telecom. For example, many called users use old terminals, or the presence client ends are not turned on for various reasons, thus the presence information cannot be obtained to popularize the presence service in this field, as a result, users are baffled from having a better communication experience via the presence service.

In conclusion, the existing ringback tone service and presence service are inconvenient and deficient in practical application, and neither of them can meet the strict requirements of users on the communication service. Therefore, the ringback tone service and the presence service need to be improved.

SUMMARY OF THE INVENTION

One embodiment of the present invention provides a method for providing presence information using a ringback tone, including: obtaining a subscription record of a ringback tone presence service corresponding to a user terminal of a call and a routing address of a ringback tone device when the call is initiated, and connecting the call to the ringback tone device according to the routing address of the ringback tone device; obtaining, by the ringback tone device, a presence information of a called user according to a user terminal number of the call; and sending, by the ringback tone device, the presence information of the called user to a calling user terminal.

Another embodiment of the present invention provides a system for providing presence information using a ringback tone, including a switching control system, a ringback tone device and a presence server, wherein:

the switching control system, capable of saving a subscription record of a ringback tone presence service corresponding to a user terminal and a routing address of the ringback tone device, and obtaining the subscription record of the ringback tone service saved by the user terminal and the routing address of the ringback tone device upon receiving a call, and connecting the call to the ringback tone device according to the routing address of the ringback tone device;

the presence server, capable of obtaining the presence information of a called user and providing the presence information to the ringback tone device; and the ringback tone device, capable of obtaining the presence information of the called user provided by the presence server according to a user terminal number upon receiving the call, and sending the presence information to a calling user terminal.

Another embodiment of the present invention further provides a ringback tone device, including:

a ringback tone control module, capable of receiving a call connected by a switching control system on a network, obtaining presence information of a called user provided by a presence information receiving module according to a called user terminal number, and sending the presence information of the called user as a ringback tone to the calling user terminal; and a presence information receiving module, capable of receiving the presence information of the called user and providing the presence information to the ringback tone control module.

In conclusion, in the embodiments of the present invention, the ringback tone service and the presence service are combined effectively, and the presence information dynamically configured by the called user is obtained by the ringback tone device from the presence server according to the service subscription record of the user, and is sent to the calling user. Thereby, the calling user may easily obtain the presence information configured by the called user via the ringback tone and may know the current state, mood, etc of the called user, so that the individualized experience of the user may be improved, and the telecom service types may be further enriched. Moreover, because the present invention uses the ringback tone to provide the presence information of the called user to the calling user, the calling user terminal may obtain the presence information of the called user whether the calling user terminal supports presence service or the presence client end is turned on. Therefore, the presence service is popularized.

DETAILED DESCRIPTION OF THE EMBODIMENTS

To make the objects, technical solutions and advantages of embodiments of the present invention more apparent, the embodiments of the present invention will now be further illustrated in conjunction with the drawings and embodiments.

The concept of the embodiments of the present invention lies in that: when a calling user terminal dials a called user terminal, a switching control system routes the call to a ringback tone device according to the subscription record of the ringback tone presence service for the user, and the ringback tone device obtains presence information of the called user provided by the presence server and sends the presence information to the calling user terminal.

It is apparent that a user needs to subscribe for a ringback tone presence service to realize the ringback tone presence service, and the user may be a called user or a calling user. The user may subscribe for the ringback tone presence service by signing in a business hall, dialing a specific number or via Internet, etc and the subscription record of the ringback tone presence service is saved in the switching control system.

Figure 1:
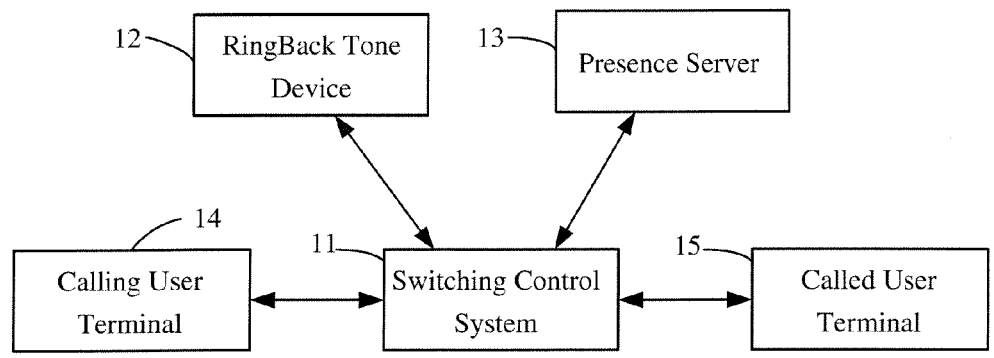
FIG. 1 is a structural diagram of a presence information system according to one embodiment of the present invention.

FIG. 1 is a structural diagram of an embodiment of a presence information system according to the present invention, and the presence information system includes: switching control system 11, ringback tone device 12, presence server 13, calling user terminal 14 and called user terminal 15, wherein switching control system 11 is in communication with ringback tone device 12, calling user terminal 14 and called user terminal 15 respectively, and presence server 13 is in communication with ringback tone device 12 and called user terminal 15 respectively.

Switching control system 11 is adapted to switch and control the communication between calling user terminal 14 and called user terminal 15, save the subscription record for the ringback tone presence service corresponding to the calling user or the called user and the route address of the ringback tone device, receive a call, and connect the call to ringback tone device 12 according to the routing address of the ringback tone device after determining that the user of the call has a corresponding subscription record of the ringback tone presence service.

Ringback tone device 12 is adapted to obtain the presence information of the called user provided by presence server 13 according to the user terminal number after receiving the call, and send the presence information to calling user terminal 14. In the present invention, ringback tone device 12 may be an Intelligent Peripheral (IP) or a dedicated RingBack Tone Server (RBTS). Ringback tone device 12 may provide a ringback tone containing the presence information of the called user obtained from presence server 13, to calling user terminal 14, or may provide a normally customized ringback tone of the user. Here, to be distinguished from the presence information acting as the ringback tone of the called user, a ringback tone provided by the existing ringback tone customization service is referred to as a normally customized ringback tone.

Presence server 13 is adapted to save an authorization record of called user terminal 15 on the ringback tone presence service, obtain the presence information of the called user dynamically configured by the called user, and provide the presence information to ringback tone device 12. In the system of the present invention, presence server 13 and ringback tone device 12 may be two independent network entities respectively, or presence server 13 may be configured in ringback tone device 12.

Calling user terminal 14 and called user terminal 15 may be fixed telephones or mobile phones, etc.

In the system of the present invention, switching control system 11 may include a switching device and a Home Location Register (HLR).

The HLR is adapted to save the subscription record of the ringback tone presence service corresponding to the user terminal and the routing address of the ringback tone device, and determine whether the service subscription record exists according to the calling and called user terminal numbers of the current call, and the current call is initiated by the calling user terminal calling the called user terminal.

The switching device is adapted to obtain the subscription record for the ringback tone presence service and the routing address of the ringback tone device from the HLR, and connect the call to the ringback tone device according to the obtained routing address of the ringback tone device after determining that the corresponding subscription record of the ringback tone presence service exists in the user terminal of the current call according to the received call information.

Another structure of switching control system 11 may include a switching device and a Service Control Point (SCP).

The SCP is adapted to save a subscription record of a ringback tone presence service corresponding to a user terminal and a routing address of the ringback tone device, and indicate the switching device to connect a call to the ringback tone device according to the routing address of the ringback tone device after determining that the corresponding subscription record of the ringback tone presence service exists in the user terminal of the current call according to the received call information.

The switching device is adapted to receive the call, report the call information to the SCP, and connect the call to the ringback tone device after receiving the routing address of the ringback tone device from the SCP.

Figure 2:
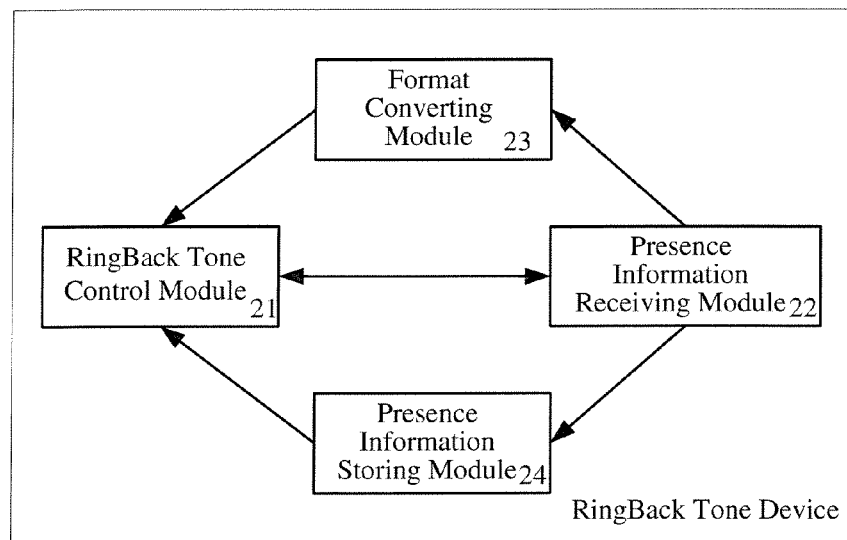
FIG. 2 is a structural diagram of a ringback tone device according to one embodiment of the present invention.

FIG. 2 is a structural diagram of a ringback tone device according to one embodiment of the present invention. Referring to FIG. 2, one embodiment of the present invention provides a ringback tone device. The basic internal structure of the ringback tone device includes ringback tone control module 21 and presence information receiving module 22, and may further include format converting module 23 and presence information storing module 24.

Ringback tone control module 21 is adapted to receive a call connected by the switching control system on the network, control a transmission of the ringback tone to the calling user terminal, obtain the called user terminal number from the call received, send the called user terminal number to presence information receiving module 22, and send the presence information of the called user sent from presence information receiving module 22 to the calling user terminal as a ringback tone.

Presence information receiving module 22 is adapted to receive the presence information of the called user sent from an external presence server, and provide the presence information to ringback tone control module 21.

Referring to FIG. 2, if the ringback tone device further includes format converting module 23, format converting module 23 may be connected with ringback tone control module 21 and presence information receiving module 22 respectively. Format converting module 23 is adapted to receive the presence information of the called user provided by presence information receiving module 22, and send the presence information to ringback tone control module 21 after converting the presence information into a format that may be understood by the calling user; ringback tone control module 21 is adapted to send the presence information after format converting to the calling user terminal.

Herein, format converting module 23 may be a voice synthesis module, wherein the presence information of the called user received by presence information receiving module 22 is in a text format. Presence information receiving module 22 is further adapted to send the presence information of the called user in the text format to the voice synthesis module (format converting module 23). The voice synthesis module (format converting module 23) converts the received presence information of the called user in the text format into a voice format, and sends the presence information of the called user in the voice format to ringback tone control module 21. Ringback tone control module 21 sends the presence information of the called user in the voice format to the calling user terminal.

Of course, the presence information sent by the presence server may include a voice format, a text format, an image format, a multimedia format and a combination thereof. But the calling user terminal may not support some information formats; and format converting module 23 needs to convert the presence information into a format that may be appreciated by the calling user terminal. For example, the presence server sends the presence information carried in a multimedia message to presence information receiving module 22 of the ringback tone device; ringback tone control module 21 determines whether the calling user terminal can support the multimedia message MMS, and performs different processing according to different bearer capabilities (such as a display resolution and a terminal capacity) of the user terminal. For example, when the user terminal does not support MMS, format converting module 23 converts the MMS into a message in the text format, and ringback tone control module 21 sends the message in the text format to the calling user terminal.

In the present invention, there are at least two solutions for providing the presence information of the called user by the presence server:

An embodiment of the first Solution for providing the presence information of the called user by the presence server is that the presence server sends a presence information according to a request.

After receiving a call connected by the network, a ringback tone control module 21 sends a request for obtaining presence information of a called user to a presence information receiving module 22 according to the called user terminal number in the call information; presence information receiving module 22 sends the request to an external presence server, and the presence server performs an authentication to the request of the presence information, if the authentication is successful, the presence server sends the presence information of the called user to presence information receiving module 22 and presence information receiving module 22 further provides the presence information to ringback tone control module 21.

An embodiment of the other solution for providing the presence information of the called user by the presence server is that the presence server automatically sends the latest presence information to the ringback tone device.

Referring to FIG. 2, the ringback tone device of the present invention may further include presence information storing module 24 connected with ringback tone control module 21 and presence information receiving module 22 respectively. Wherein, after the user terminal customizes a ringback tone presence service, the presence server automatically sends the latest presence information of the called user to presence information receiving module 22 of the ringback tone device, and presence information receiving module 22 forwards the presence information to presence information storing module 24; after receiving the call connected by the network, ringback tone control module 21 obtains the presence information of the called user from presence information storing module 24 according to the called user terminal number in the call information and sends the obtained presence information as a ringback tone to the calling user terminal. In this embodiment, the ring back tone device may obtain the presence information of the called user from the presence information storing module according to the called user terminal number and send the presence information to the calling user terminal in the future, rather than requesting the presence server to provide the presence information every time. Therefore, the signaling interactions may be reduced to a certain extent.

Notably, in the present invention, the ringback tone device may further save several ringback tone content templates configured by the user or/and preconfigured by the system. These ringback tone content templates correspond to different ringback tones respectively, and reduce the cost of the present invention much lower and make the present invention easier to be used.

The ringback tone device configures a first correspondence between the presence information of the called user and the ringback tone content template. After obtaining the presence information of the called user, the ringback tone device finds the ringback tone content template corresponding to the presence information according to the first correspondence, and sends the ringback tone corresponding to the ringback tone content template to the calling user terminal. For an individual user, the called user configures the ringback tone template corresponding to a meeting state as a voice of "I am now . . . , and I will call back later". If the called user has a meeting, the called user may inform that the called user is in the state of "Meeting". When the call is initiated, the calling user terminal may hear a ringback tone of "I have a meeting, and I will call back later". For example, for entertainment and individualization, the presence service may further provide more detailed description related to the user state, such as "I am bothered", "I am busy" and "I am shopping". For industrial applications, for example, for a marketer going on an errand, the template may be customized as "I am going to . . . (someplace), if emergency communication is required, please dial mobile phone number xx or send an Email to x@x.com". Therefore, no customer will be lost due to out of contact.

Figure 3:
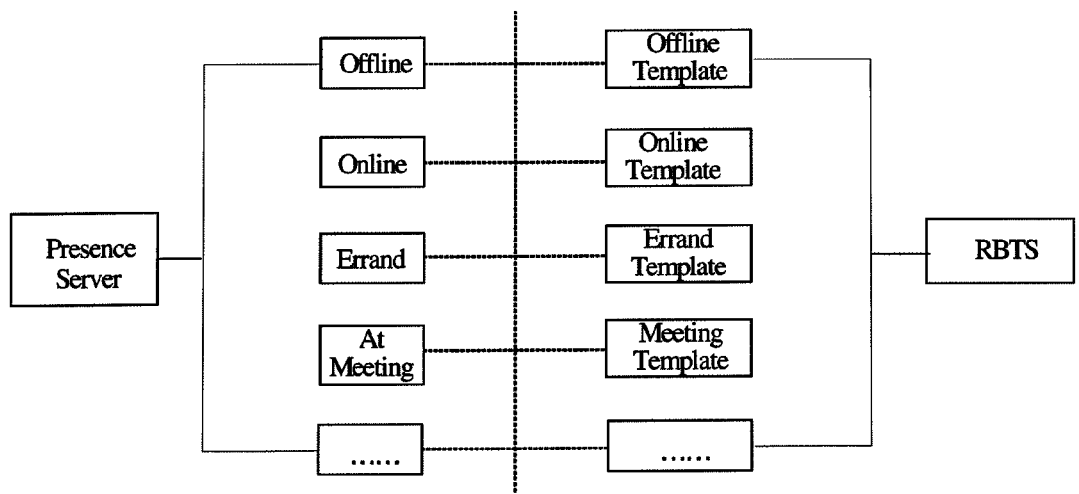
FIG. 3 is a schematic diagram of a ringback tone content template according to one embodiment of the present invention.

As shown in FIG. 3, in each presence information state provided by the presence server, the ringback tone device provides some ringback tone content templates, such as an offline template corresponding to an offline state, an online template corresponding to an online state, an errand template corresponding to an errand state and a meeting template corresponding to a meeting state. Additionally, the user may use a template directly, or may record a part of something to replace part or the whole of a template.

An embodiment for a ringback tone system may provide a ringback tone content template to a user for various presence information, the ringback tone content template may directly be used by the user. In the embodiment, the user does not need to perform any configuration. For example, if a user is on an offline state, a template of "The user you are calling is off the fixed phone (mobile phone), please redial later" may be provided.

Another embodiment for a ringback tone system may provide a ringback tone content template to a user, the user could replace a part of the template for various presence information. such as a content template is "Hello, my master A is at rest, if there is no anything important, please dial again after time B", the content template may be used when called user A is at rest and time B is the working time, called user A may select the first part and select the second part for configured a presence information state as "At Rest".

Another embodiment for a ringback tone system may provide a ringback tone content template to a user, the user could replace the whole of the template for various presence information. In other words, the user DIYs (Do It by Yourself) a template and correlates the template with the state, the individualization is much stronger. For example, a humorous monologue of the user may be recorded.

The present invention will now be illustrated in more detail in conjunction with the specific embodiments.

Figure 4:
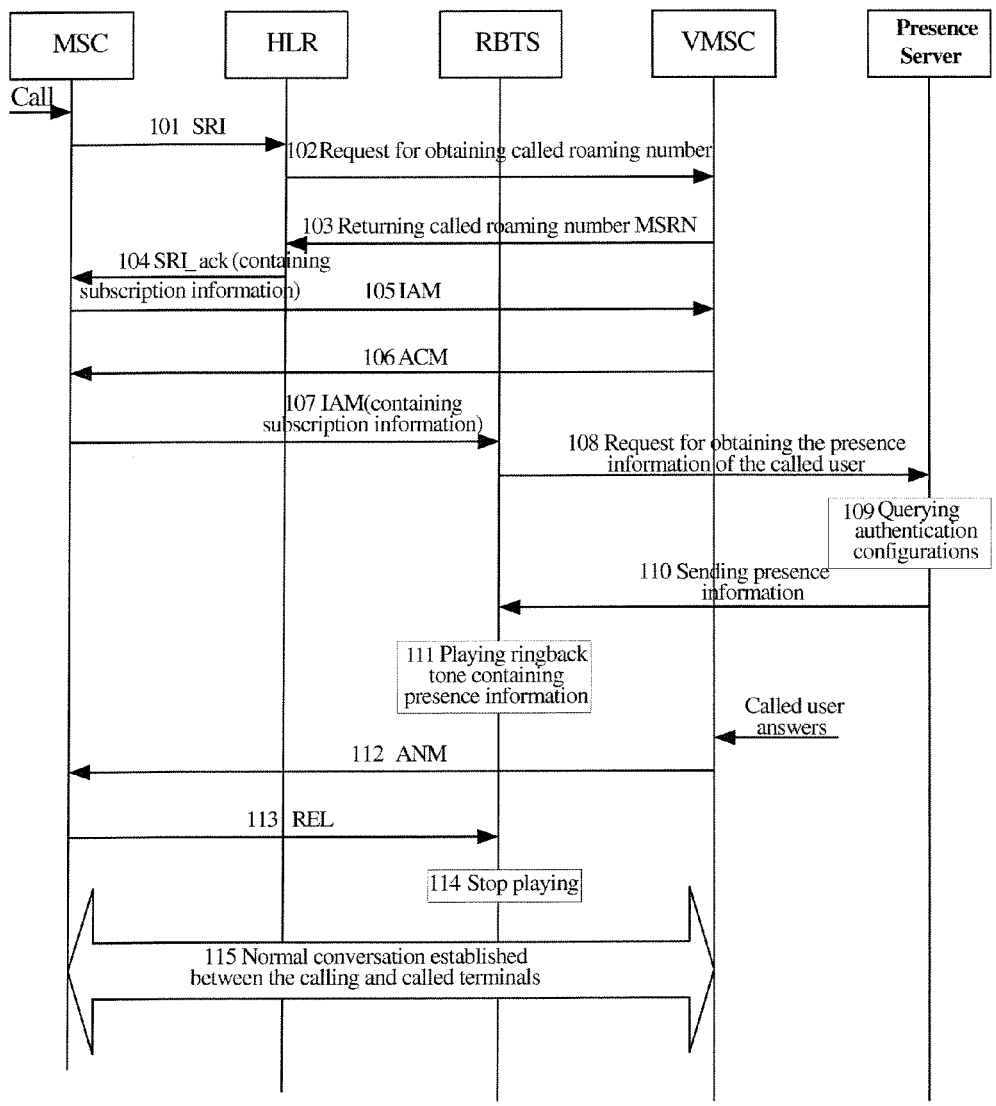
FIG. 4 is a signaling flow chart according to one embodiment of the present invention.

FIG. 4 is a signaling flow chart according to an embodiment of the present invention, and shows an exchange solution in which the called user customizes a ringback tone presence service. This solution may reduce signaling interaction, the network resources may be saved. The solution particularly includes the following steps.

Step 101: When the Mobile Switching Center (MSC) receives a call request from a calling user terminal, the MSC sends a request SRI for obtaining the routing information of the called user terminal to the HLR to which the called user terminal pertains, wherein the request includes information such as called user terminal number MSISDN.

Steps 102 to 103: The HLR saves the subscription record of a ringback tone presence service of the called user terminal and the routing address of the ringback tone device, and the HLR determines that the called user is a subscriber of the ringback tone presence service according to the called user terminal number. The HLR sends a request for obtaining the called roaming number to the Visited Mobile Switching Center (VMSC), and the VMSC allocates a roaming number MSRN to the called user terminal and then sends the MSRN to the HLR.

Step 104: The HLR sends the called roaming number and the subscription information of the ringback tone presence service to the MSC via a message SRI_Ack, wherein the subscription information of the ringback tone presence service at least includes the subscription record of the ringback tone presence service of the called user terminal and the routing address of the ringback tone device.

Step 105: The MSC sends an initial address message (IAM) to the VMSC. Herein, the IAM includes the calling user terminal number, the called user terminal number and the called roaming number MSRN.

Step 106: The VMSC pages the called user terminal, and sends the idle state information to the MSC via an Address Complete Message (ACM) when the called user terminal is in idle state. If the current state of the called user terminal is not idle, for example, busy, turned off or out of service, the VMSC transparently transmits a voice prompt indicating that the user is busy, turned off or out of service, to the calling user terminal via the MSC.

Step 107: The MSC sends an IAM to a RingBack Tone Sever (RBTS), and sends the calling user terminal number, the called user terminal number and the ringback tone presence service identifier and so on to the RBTS via the IAM. Therefore, the present embodiment shows an exchange solution in which the ringback tone is played under the control of the MSC. Notably, the ringback tone presence service identifier may be realized by adding a prefix before the called roaming number. Therefore, after receiving the ringback tone presence service identifier, the ringback tone device determines the processing logic of the subsequent service, i.e. sends a request for obtaining the presence information to the presence server. If no ringback tone presence service identifier is received or a normal ringback tone customization service identifier is received, the RBTS may process with the same way of a service processing logic when playing a normally customized ringback tone.

Step 108: A second correspondence between the called user terminal number and at least one calling user terminal number is configured in the RBTS. After receiving the IAM from the MSC, the RBTS determines whether the relationship between the obtained calling user terminal number and the called user terminal number of the current call meets the configured second correspondence; if the configured second correspondence is met, the RBTS sends a request carrying the called user terminal number for obtaining the presence information of the called user, to the Presence Server; if the configured second correspondence is not met, the RBTS performs the normal process, for example, a normal ringback tone is played for the calling user terminal.

Additionally, a ringback tone presence service session may be further configured in the RBTS. For example, the quitting time from 18:00 to 09:00 is configured as the ringback tone presence service session, while the working time from 9:00 to 18:00 is configured as the non-service session. Before the RBTS requests the presence server to obtain the presence information, the BRTS determines whether the current time belongs to the configured ringback tone presence service session; if the current time belongs to the configured ringback tone presence service session, the BRTS sends a request for obtaining the presence information of the called user to the presence server; if the current time does not belong to the configured ringback tone presence service session, the RBTS may not send a request for obtaining the presence information to the presence server. For example, if the calling user terminal calls the called user terminal at 16:30 and the RBTS determines that this time is non-service session, the RBTS will not request the presence server to provide the presence information of the called user. In the present invention, the selection of individual service is enriched by configuring the service session.

Step 109: The presence server authenticates the presence information request sent from the RBTS, and determines whether the called user has authorized the ringback tone presence service and the related configurations, such as what content and what format is sent to the RBTS, according to the called user terminal number carried in the request. For example, the called user has authorized and has been configured to send the presence information in text format to the RBTS.

Step 110: After the presence server successfully authenticates the presence information request, the presence server sends the presence information of the called user to the ringback tone device RBTS.

Step 111: After the RBTS obtains the presence information of the called user, the RBTS sends the presence information to the calling user terminal in a format capable of being understood by the calling user terminal, such as a voice format, a text format, an image format, a multimedia format and a combination thereof. Wherein, the RBTS may save various play rules of the ringback tone presence service configured by the called user terminal. The rules may include the following.

The first rule may lie in that: when no answer signal is received form the called user terminal in a predetermined session (for example, 30 seconds) after the RBTS sends the presence information, or when no answer signal is received of the called user terminal after the RBTS sends the presence information for several times (for example, 3 times), if a rule mentioned above is met, the RBTS stops playing the ringback tone. Therefore, a reasonable time for playing the ringback tone including the presence information may be defined.

The second rule may lie in that: the RBTS receives an answer signal from the called user terminal, and determines whether the sending of the current presence information is completed; if not, the RBTS continues to send the presence information to the calling user terminal and then enters the normal conversation between the calling and called user terminals. Therefore, it may be avoided to partially play the presence information and result in a bad effect on the communication experience of the calling user.

The third rule may lie in that: the called user terminal is a subscriber customizing a normally ringback tone service; after the RBTS sends the presence information of the predetermined session or sends the presence information for several times, if no answer signal is received, the normally customized ringback tone corresponding to the user terminal of the current call is sent to the calling user terminal.

The fourth rule may lie in that: the RBTS synthesizes the presence information of the called user and the background sound, such as a piece of melodious music, in a voice file, and then play the presence information and the background sound to the calling user terminal.

It should be noted that, in practice, the rules mentioned above may be employed combination.

Step 112: After the called user terminal answers, the VMSC send an answer message ANM to the MSC.

Step 113 to Step 114: The MSC sends an REL (Release) signaling to the RBTS and disconnects the routing between the MSC and the RBTS immediately. Therefore, the ringback tone including the presence information is not played to the calling user terminal.

Step 115: A normal signaling link is established between the calling party and called party via the MSC and the VMSC.

Additionally, the present embodiment describes a called user customization solution. In fact, the present invention may further include a calling user customization solution. Wherein, the HLR saves the subscription record of the ringback tone presence service of the calling user terminal and the routing address of the ringback tone device, and the HLR obtains that the calling user terminal is a subscriber of the ringback tone presence service according to the calling user terminal number. However, the ringback tone presence service may be authorized and confirmed by the called user terminal. A third correspondence between the calling user terminal number and at least one called user terminal numbers is configured in the RBTS. Before the RBTS obtains the presence information of the called user, the RBTS determines whether the relationship between the obtained calling user terminal number and the called user terminal number of the current call meets the third correspondence. If the third correspondence is met, the RBTS continues to perform the step of obtaining the presence information. If the third correspondence is not met, the RBTS performs a conventional process, for example, the RBTS plays a normal ringback tone to the calling user terminal. Other processing of the calling user customization solution is basically the same as that of the called user customization solution, and repeat descriptions are omitted.

By using the technology of the present invention, the calling user may easily obtain the presence information configured by the called user via the ringback tone and may know the current state, mood and so on of the called user, so that the individualized experience of the user may be improved, and it is convenient for the calling user to select a suitable communication mode or time to communicate with the called user, and the service types of the telecom operator may be further enriched. Additionally, in the present invention, a ringback tone is used to provide the presence information of the called user to the calling user; therefore, whether the calling user terminal supports the presence service or the presence client end is turned on, the calling user terminal may obtain the presence information of the called user. As a result, the presence service may be popularized.

Figure 5:
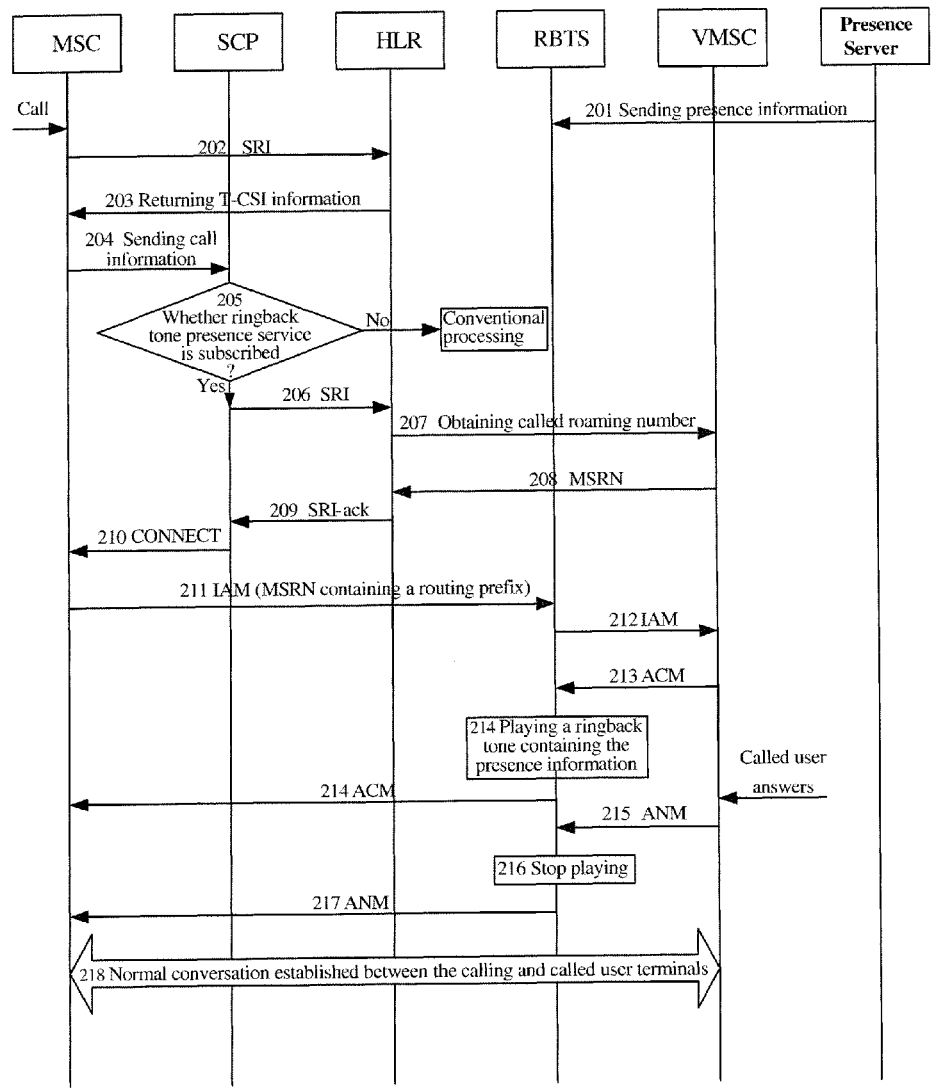
FIG. 5 is a signaling flow chart according to one embodiment of the present invention.

FIG. 5 shows a signaling flow chart of the second embodiment of the present invention, and illustrates an intelligent network solution in which the called user customizes a ringback tone presence service. In this solution, the switching center and so on do not need to be modified, so the cost is lower, and this solution is convenient to be implemented and popularized rapidly. Specifically, the solution includes the following steps.

Step 201: After the called user customizes a ringback tone presence service, the presence server automatically sends the latest presence information of the called user to a ringback tone device RBTS, and the RBTS saves the presence information. By using the present solution, the RBTS may obtain the presence information of the called user according to the called user terminal number and send the presence information to the calling user terminal in the future, rather than requesting the presence server to provide the presence information every time. Therefore, this solution may reduce the signaling interactions to a certain extent and save signaling line resources.

Step 202: When the MSC receives a call request from the calling user terminal, the MSC sends a request SRI for obtaining the routing information of the called user terminal to the HLR to which the called user terminal pertains, wherein the request includes information such as a called user terminal number MSISDN.

Step 203: The HLR determines that the called user is an intelligent network user according to the called user terminal number, and sends the subscription information of the called user to the MSC. Herein, because this scheme is used in the intelligent network in the present embodiment, the called user is registered as an intelligent subscriber. Thus, the subscription information of the called user is saved as T-CSI information.

Step 204: After the MSC obtains the T-CSI information of the called user, the MSC determines that the called user is an intelligent network user, and reports the call information to the SCP. Herein, the call information at least includes the calling user terminal number and the called user terminal number, etc.

Step 205: The SCP determines whether the called user is a subscriber of the ringback tone presence service according to the saved subscription record of the ringback tone presence service for the called user and the called user terminal number of the current call. If the called user is a subscriber of the ringback tone presence service, Step 206 and subsequent processes shown in FIG. 5 are performed. If the called user is not the subscriber of the ringback tone presence service, a conventional process is performed. In brief, a connection between the MSC and the VMSC is established.

Steps 206 to 209: The SCP sends a request SRI (Sending Routing Information) to the HLR to which the called user terminal pertains. After receiving the request message, the HLR sends a request for obtaining the called roaming number to the VMSC. The VMSC allocates a roaming number MSRN to the called user terminal, and then sends the MSRN to the HLR. Then, the HLR sends the MSRN allocated to the called user terminal by the VMSC to the SCP via an SRI acknowledge signaling SRI_ack.

Step 210: The SCP sends the called roaming number and the called user terminal number to the MSC via an instruction CONNECT. Herein, the called roaming number is the MSRN with a routing prefix wherein the routing prefix is the RBTS routing address.

Step 211: After receiving the instruction CONNECT from the SCP, the MSC routes the call to the RBTS according to the routing prefix, and sends an Initial Address Message (IAM) to the RBTS in a forwarding way. Herein, the IAM includes the calling user terminal number, the called user terminal number and the called roaming number MSRN with the routing prefix.

Step 212: After receiving the IAM from the MSC, the RBTS removes the routing prefix before the MSRN and extracts the called user terminal number, and then sends the calling user terminal number and the called MSRN to the VMSC via the IAM.

Step 213: The VMSC pages the called terminal and determines whether the current state of the called terminal is idle. If the current state of the called terminal is idle, the VMSC sends an ACM to the RBTS; if the current state of the called terminal is not idle, for example, busy, turned off or out of service, the VMSC transparently transmits a voice prompt indicating the user state of busy, turned off or out of service and being played by the VMSC, to the calling user terminal via the MSC.

Step 214: After receiving the message ACM from the VMSC, the RBTS sends the message ACM to the MSC, and searches for the subscription record of the ringback tone presence service of the called user according to the called user terminal number, and then plays a ringback tone containing the presence service customized by the called user to the calling user terminal via the MSC and shields the conventional ringback tone played by the VMSC. For example, if the presence information of the called user received by the RBTS is "Travel", the RBTS plays "I am travelling, what is the emergency?" and so on to the calling user terminal.

Step 215 to 218: When the called user answers, the VMSC sends an ANM (Answer Message) to the RBTS. After receiving the ANM, in step 216, the RBTS stops playing the ringback tone to the calling user terminal. In step 217, the RBTS sends the ANM to the MSC, and establishes a signaling between the MSC and the VMSC via a trunk of the RBTS. Therefore, a normal conversation may be realized between the calling user terminal and the called user terminal.

In conclusion, according to the present invention, the ringback tone service and the presence service are combined effectively to send to the calling user the presence information dynamically configured by the called user, which is obtained by the ringback tone device from the presence server according to the service subscription record of the user, As a result, the individualized experience of the user is improved and the presence service is popularized.

It should be emphasized that the above-described embodiments, particularly, any preferred embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

The invention claimed is:

1. A method for providing ringback tone presence service, comprising:

receiving, by a Mobile Switching Center (MSC), a call request from a calling user terminal;

sending, by the MSC, a request for obtaining routing information of a called user terminal to a Home Location Register (HLR), wherein the called user terminal pertains to the HLR, and wherein the called user terminal is a subscriber of a ringback tone presence service based on a called user terminal number;

receiving, by the MSC from the HLR, a called roaming number and subscription information of the ringback tone presence service;

sending, by the MSC, a calling user terminal number, the called user terminal number, and a ringback tone presence service identifier to a ringback tone server (RBTS) if the called user terminal is in an idle state;

sending, by the RBTS, a request for obtaining presence information to a presence server after receiving the ringback tone presence service identifier;

sending, by the RBTS, the presence information to the calling user terminal in a format understood by the calling user terminal after the RBTS obtains the presence information of the called user terminal;

determining, by the RBTS, whether the sending of the presence information by the RBTS to the calling user terminal is completed after the called user terminal answers;

continuing, by the RBTS, to send the presence information to the calling user terminal when it is determined that the RBTS has not completed the sending of the presence information; and establishing a normal signaling link between the calling user terminal and the called user terminal until the presence information has been completely sent to the calling user terminal.

2. The method for providing ringback tone presence service according to claim 1, wherein the ringback tone presence service identifier includes a prefix followed by the called roaming number.

3. The method for providing ringback tone presence service according to claim 1, further comprising automatically sending, by the presence server, a latest presence information of the called user terminal to the RBTS.

4. The method for providing ringback tone presence service according to claim 1, further comprising:

saving, by the RBTS, a specific ringback tone corresponding to a ringback tone content template;

configuring, by the RBTS, a first correspondence between the presence information of the called user terminal and the ringback tone content template;

finding, by the RBTS, the ringback tone content template corresponding to the presence information according to the first correspondence upon obtaining the presence information of the called user terminal; and sending the specific ringback tone corresponding to the ringback tone content template to the calling user terminal.

5. The method for providing ringback tone presence service according to claim 1, further comprising:
  obtaining, by the RBTS, the presence information of the called user terminal from the presence server in a text format;
  converting, by the RBTS, the presence information of the called user terminal from the text format into a voice format; and
  sending, by the RBTS, the presence information in the voice format to the called user terminal.

6. The method for providing ringback tone presence service according to claim 1, wherein sending the presence information to the calling user terminal comprises sending one of a plurality of different ringback tone content templates to the calling user terminal, wherein the plurality of different ringback tone content templates comprise an offline template, an online template, an errand template, and a meeting template, and wherein each of the plurality of different ringback tone content templates comprise content that can be modified by a user.

7. The method for providing ringback tone presence service according to claim 1, further comprising:
  storing the presence information in a plurality of different formats;
  selecting one of the plurality of different formats based at least in part on a capability of the calling user terminal; and
  sending the presence information to the calling user terminal in the selected one of the plurality of different formats.

8. The method for providing ringback tone presence service according to claim 7, wherein the plurality of different formats comprise a voice format, a text format, an image format, and a multimedia format.

9. The method for providing ringback tone presence service according to claim 1, further comprising determining whether the called user terminal is subscribed to the ringback tone presence service, and wherein sending the presence information to the calling user terminal comprises sending the presence information to the calling user terminal when it is determined that the called user terminal is subscribed to the ringback tone presence service.

10. A system for providing ringback tone presence service, comprising:
  a Mobile Switching Center (MSC); and
  a ringback tone server (RBTS),
  wherein the MSC is adapted to:
    receive a call request from a calling user terminal;
    send a request for obtaining routing information of a called user terminal to a Home Location Register (HLR), wherein the called user terminal pertains to the HLR, and wherein the called user terminal is a subscriber of a ringback tone presence service based on a called user terminal number;
    receive a called roaming number and subscription information of the ringback tone presence service from the HLR;
    send a calling user terminal number, the called user terminal number, and a ringback tone presence service identifier to the RBTS if the called user terminal is in an idle state; and
    establish a normal signaling link between the calling user terminal and the called user terminal until presence information of the called user terminal has been completely sent to the calling user terminal;
  wherein the RBTS is adapted to:
    send a request for obtaining the presence information of the called user terminal to a presence server after receiving the ringback tone presence service identifier;
    receive the presence information of the called user terminal from the presence server;
    send the presence information to the calling user terminal in a format understood by the calling user terminal after the RBTS obtains the presence information of the called user terminal;
    determine whether the RBTS has completed sending the presence information to the calling user terminal after the called user terminal answers; and
    continue to send the presence information from the RBTS to the calling user terminal when it is determined that the RBTS has not completed sending the presence information to the calling user terminal.

11. The system for providing ringback tone presence service according to claim 10, wherein the RBTS is further adapted to receive a latest presence information of the called user terminal automatically sent by the presence server.

12. The system for providing ringback tone presence service according to claim 10, wherein the RBTS is further adapted to obtain the presence information of the called user terminal from the presence server in a text format, convert the presence information from the text format into a voice format, and send the presence information in the voice format to the called user terminal.

13. The system for providing ringback tone presence service according to claim 10, wherein the RBTS is further adapted to save a specific ringback tone corresponding to a ringback tone content template, configure a first correspondence between the presence information of the called user terminal and the ringback tone content template, find the ringback tone content template corresponding to the presence information according to the first correspondence upon obtaining the presence information of the called user terminal, and send the specific ringback tone corresponding to the ringback tone content template to the calling user terminal.

14. The system for providing ringback tone presence service according to claim 10, wherein the RBTS comprises a plurality of ringback tone content templates, and wherein each of the plurality of ringback tone content templates corresponds to a presence information state of the presence server.

15. The system for providing ringback tone presence service according to claim 14, wherein the plurality of ringback tone content templates comprises an offline template, an online template, an errand template, and a meeting template.

16. The system for providing ringback tone presence service according to claim 14, wherein each of the plurality of ringback tone content templates comprises content that can be modified by a user.

17. The system for providing ringback tone presence service according to claim 10, wherein the RTBS is configured to store the presence information in a plurality of different formats, wherein the RTBS is configured to select one of the plurality of different formats based at least in part on a capability of the calling user terminal, and wherein the RTBS is configured to send the calling user terminal the presence information in the selected one of the plurality of different formats.

18. The system for providing ringback tone presence service according to claim 17, wherein the plurality of different formats comprise a voice format, a text format, an image format, and a multimedia format.

19. The system for providing ringback tone service according to claim 17, wherein the capability of the calling user terminal comprises a display resolution or a terminal capacity.

20. The system for providing ringback tone service according to claim 10, wherein the RBTS comprises a first time interval designated as a service session and a second time interval designated as a non-service session, wherein the RBTS is configured to determine a time when the calling user terminal calls the called user terminal, wherein the RBTS is configured to determine whether the time is included in the first time interval or in the second time interval, wherein the RBTS is configured to provide the presence information when the call is received in the service session, and wherein the RBTS is configured to not provide the presence information when the call is received in the non-service session.

* * * * *